United States Patent [19]

Wapperom

[11] Patent Number: 4,516,256

[45] Date of Patent: May 7, 1985

[54] MOVABLE PROJECTOR UNIT FOR GAMMA RADIATION FOR WELDING CONTROL PURPOSES WITH PIPE-LINES AND THE LIKE

[75] Inventor: Pieter Wapperom, Rotterdam, Netherlands

[73] Assignee: Röntgen Technische Dienst B.V., Rotterdam, Netherlands

[21] Appl. No.: 277,805

[22] Filed: Jun. 26, 1981

[30] Foreign Application Priority Data

Jun. 27, 1980 [NL] Netherlands .......................... 8003756

[51] Int. Cl.[3] ............................................. G03B 41/16

[52] U.S. Cl. .................................... 378/60; 250/497.1

[58] Field of Search ........................... 378/60; 250/497

[56] References Cited

U.S. PATENT DOCUMENTS 3,085,157 4/1963 Ginsburgh .......................... 250/106

3,272,987 9/1966 Kohn .................................. 250/497

4,283,628 8/1981 Kulekov ................................ 378/60

FOREIGN PATENT DOCUMENTS 1313153 11/1961 France .

299850 10/1963 Netherlands .

*Primary Examiner*—Craig E. Church

*Attorney, Agent, or Firm*—Brumbaugh, Graves, Donohue & Raymond

[57] ABSTRACT

A movable projector unit for welding control purposes with pipe-lines and the like, comprising a motor driven carriage, a carriage mounted projector for gamma radiation provided with a protective housing having an axially extending channel therein for the movement of a holder for a radio-active source, and a micro-pneumatic device to move said source holder from the shielded rest position in the housing to an exposure position and back, and a remotely controllable, electronic unit to control the motor of the carriage and the micro-pneumatic device of the projector.

7 Claims, 2 Drawing Figures

MOVABLE PROJECTOR UNIT FOR GAMMA RADIATION FOR WELDING CONTROL PURPOSES WITH PIPE-LINES AND THE LIKE

BACKGROUND OF THE INVENTION

The invention relates to a movable projector unit for welding control purposes with pipe-lines and the like. A projector capable of emitting gamma rays can be used to control the homogeneity of weldings in or with pipe-lines with the aid of gamma radiography. A radio-active source of gamma rays is used in this case, which source must be positioned in or outside the pipe-line at the location of a welded joint. If the radio-active source is not employed it is positioned in a protective housing, having, for example, uranium as shielding material. If an exposure is to be taken, the radio-active source is moved by a movement mechanism to an exposure position outside the protective housing, after which, in this position and during a certain exposure time, an image of the weld is fixed on a röntgen film.

In order to control the welds rapidly from location to projector is joined with a motor driven carriage or crawler in accordance with the invention under application of an electronic control unit. In case such a carriage is employed in pipe-lines of different cross-section, said carriage can have different dimensions as well. For example for pipe-lines having a cross-section from 15 cm to 150 cm, different carriages are used having succeeding larger dimensions.

Said carriages of different dimensions, however, all have a similar mechanism for moving said radio-active source from the protective housing to the exposure position outside said housing. The radio-active source, depending upon its type, must be displaced over a distance of from 50 mm to 70 mm in a suitable fitting channel in order to avoid leakage radiation through slits.

From the state of the art a movement known mechanism is provided with a solenoid for obtaining a direct linear movement. As the stroke length of a common solenoid is only about 30 mm, this stroke length is mechanically extended to the desired value. Add to this the fact that the current consumption of the solenoid is relatively high and even becomes higher through wear, dust or corrosion, by which the movement is somewhat dragged. Apart from the hold current one has to reckon also with a high starting current. The adjustment of the solenoid having a mechanical path extension and a draw-spring is critical and in case of slight dirtying by dust and other impurities brings about problems both in forward and in backward direction. Also said solenoid has to stay in working condition both at high and at low temperatures in or near pipe-lines, for example, in tropical and iced regions. When a solenoid burns through combination of high temperature and wear then a withdrawal of the radio-active source into the protective housing is unsure even after cooling off to normal surrounding temperature. The deformation and insulative lake will hamper the armature in the solenoid in its movement.

In view of above and as the increase of the stroke length in a solenoid is unsure, one has switched from the direct linear movement by means of a solenoid to an indirect linear movement. A rotating movement then is converted into a linear movement with the aid of a small motor having a toothed wheel and a gear rack, to which the radio-active source is coupled. At the end of the stroke said gear rack is held by a catch operated by a small solenoid. The required rotation time of the motor is stored in an electronic circuit. The period during which said small solenoid is excited, is given by the required exposure time. After the exposure the magnetic coupling drops off by which the return draw-spring urges the gear rack to the safe rest position. As the toothed wheel of the motor is provided with a free running wheel, said radio-active source with the aid of the return spring is moved back from its exposure position to the safe rest position as soon as the catch drops. Also, this system in practice entailed a number of difficulties resulting from the complexity and the large number of fine mechanical components, which components do not always function safely.

SUMMARY OF THE INVENTION

It is the aim of the invention to obviate the foregoing problems, and to provide a movable projector unit for gamma radiation, which projector unit is very safe and light, and which may be easily operated and controlled, and the projector of which has a strong self-cleaning action.

In accordance with the invention this is realized by a movable projector unit for welding control purposes with pipe-lines and the like, comprising a motor driven carriage, a carriage mounted projector for gamma radiation provided with a protective housing having an axially extending channel therein for the movement of a holder for a radio-active source, a micro-pneumatic device for moving said source holder from the shielded rest position in the housing to an exposure position and back, and a remotely controllable electronic unit for the control of the motor of the carriage and the micro-pneumatic device of the projector.

The invention is exceptionally advantageous in that a light projector unit, of independent operation capable to independently operate during a considerable period of time, such as a day, is obtained by, among other things, the application of a micro-pneumatic device, by which energy in compressed form is stored for linear movement of the source holder. The projector in said embodiment apart from being safe and reliable is also self-cleaning, as dust or dirt in the piping from the filling valve, cylinder, supply tank, etc. is always blown away. This self-cleaning function is not found with other movement mechanisms where precisely a stark contamination occurs at high temperatures and wear.

Said carriage for the movement of the projector for gamma radiation is provided with three components, i.e. the projector per se, the electronic unit with the power supply, and the motor unit.

BRIEF DESCRIPTION OF THE DRAWINGS

The invention will now be explained on the basis of an exemplary embodiment, with reference to the attached drawings, in which.

DETAILED DESCRIPTION OF THE DRAWINGS

Figure 1:
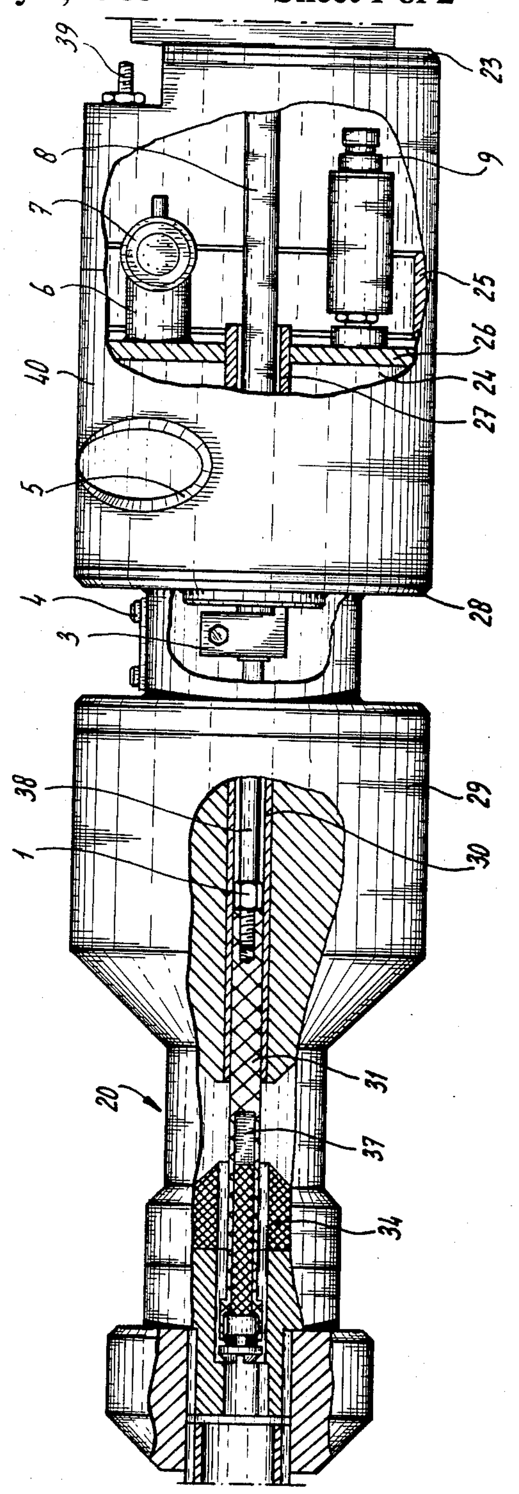
FIG. 1 shows a sectional elevation of the projector for gamma radiation in accordance with the invention.

Turning to FIG. 1, a source holder 31 comprising a radio-active source 37 is illustrated. The bar shaped source holder is coupled via a threaded screw and a locked nut to the piston 38 of the cylinder 8 of the micro-pneumatic device, which device is generally indicated with 40. In order to keep the construction length in the axial direction as small as possible, the cylinder 8 is advantageously taken up in an axial inlet bush tube 27 of the supply tank 24. An electro-magnetic three way valve 7, fixed to a support arm 6, and a reducing valve 9 are mounted on the supply tank 24 of the micro-pneumatic device. A partition 26 and a cover 28 are provided in the supply tank 24, and a support means 25 and a cover 23 are provided in the micro-pneumatic device 40.

The gas supply tank may be filled with the aid of a cartridge holder, for example having $CO_2$-gas, to the pressure indicated on a manometer of, for example, about 15 Bar. The reducing valve may be adjusted in a continuous adjustment range from 17 to 1.5 Bar, for example to about 2 Bar.

The gas is introduced into the cylinder via the reducing valve 9 and the electro-magnetic three way valve 7, which is powered with a voltage of 24 volt, 20 mA DC.

The piston 38 in the cylinder 8 is pressed outwards against the effect of the return spring to each desired stroke length between 10 and 75 mm. The adjusting block 3 serves to adjust the proper stroke length to the desired value between 10 and 75 mm. The adjusting block 3 is taken up in a space between the pneumatic device 40 and the shielding housing or container 29, which space may be closed with a cover and screws 4.

A filling valve 5 is mounted on the supply tank 24. Said supply tank in principle may be filled with any non-inflammable and non-poisonous gas. In practice one has selected $CO_2$-gas as this gas can be obtained everywhere in an almost waterfree quality and in a packing which can be easily dosed. Said gas can be introduced moreover in a simple manner. For example $CO_2$ cartridges can be used by which the tank is filled to a pressure of 15 Bar. By employing such a gas cartridge of small weight, whereby the filling valve of the micro-pneumatic device has a form adapted to the gas cartridge, it becomes possible to send energy in compressed form along with the movement mechanism of the projector such that said projector may independently operate during a considerable time. The contents of the supply tank then is sufficient to cause the micro-pneumatic cylinder to move two hundred times backwards and forwards. As the gas is exceptionally dry the system is capable of functioning at very low temperatures, for example during a considerable time at −28° C., and at high temperatures, for example, from 80° to 100° C.

The electric supply of the electro-magnetic three way valve 7 is cut off after the exposure time is completed by the electronic circuit, and said $CO_2$-gas is blown away via the three way valve by the withdrawn piston in the cylinder through the effect of the return spring. A regular self-cleaning action of the pneumatic movement mechanism comes about as the blown away gas takes away all possible dust or dirt rests. The chances of failure are also substantially reduced, as there is only one moving component, namely the piston, and also the adjustment is not critical.

The support of the cylinder away dust and dirt from the piston. Said $CO_2$-gas is dry with respect to other gasses, so that none of the supply tank, the reducing valve, the three way valve or the cylinder can oxidize or can be influenced by water. The pressure on the cylinder is selected such that the resulting force on the piston is somewhat higher than that of the return spring.

The said electro-magnetic three way valve 7 is supplied via the electronic circuit with 12 volt, 20 mA DC, and it is controlled in a positive manner. That means that the valve is open at an applied voltage of 12 volt, during which opening gas under pressure is introduced into the cylinder, while the three way valve closes when the voltage supply is ended.

An air release valve is placed on the supply tank 24 for the sake of additional safety. The remaining gas is blown away after employment of the carriage, for example, at the end of a working day, such that in addition to the radio-active source holder 31 being mechanically blocked, there is no gas pressure anymore for moving the piston.

The protective housing or container 29, which on the innerside of a wall of aluminium may have uranium as shielding material, constitutes a shielding for the radio-active gamma source 37 in case this source through the withdrawn source holder 31 is in its rest position in the axial channel 30. A generally cylindrically shaped outlet piece 34 is mounted on the protective housing 29 at a side adjacent the exposure position 20, which outlet piece is provided with an axial channel portion connecting to the axial channel 30 in the protective housing. The source holder can be moved out from the protective housing through the movement of the piston in the micro-pneumatic device until the radio-active source is in the exposure position 20. The source holder is maintained in said exposure position during a pre-adjusted exposure time. The portion of the outlet piece 34 at the outer side of the exposure position and also the source holder 31 can be of wolfram. Said outlet piece at the location of the exposure position can be implemented in a cylinder shaped form consisting of a material which hardly influences the gamma radiation such that with a panorama exposure over 360° an image of the pipe welding is recorded on a röntgen film. Also shielding material can be partially applied in the outlet piece at the location of the exposure position if required such that by a directional exposure through a non-shielded window an image over less than 360° is obtained.

It is obvious that the carriage mounted projector can be advantageously employed for the control of welded joints in a pipe-line. However, the projector can be employed as well for the control of welded joints from the outside of a pipe-line or elsewhere by means of a directional exposure via the said window in the outlet piece. Said window can be adjustable if required both in dimension and in position.

Figure 2:
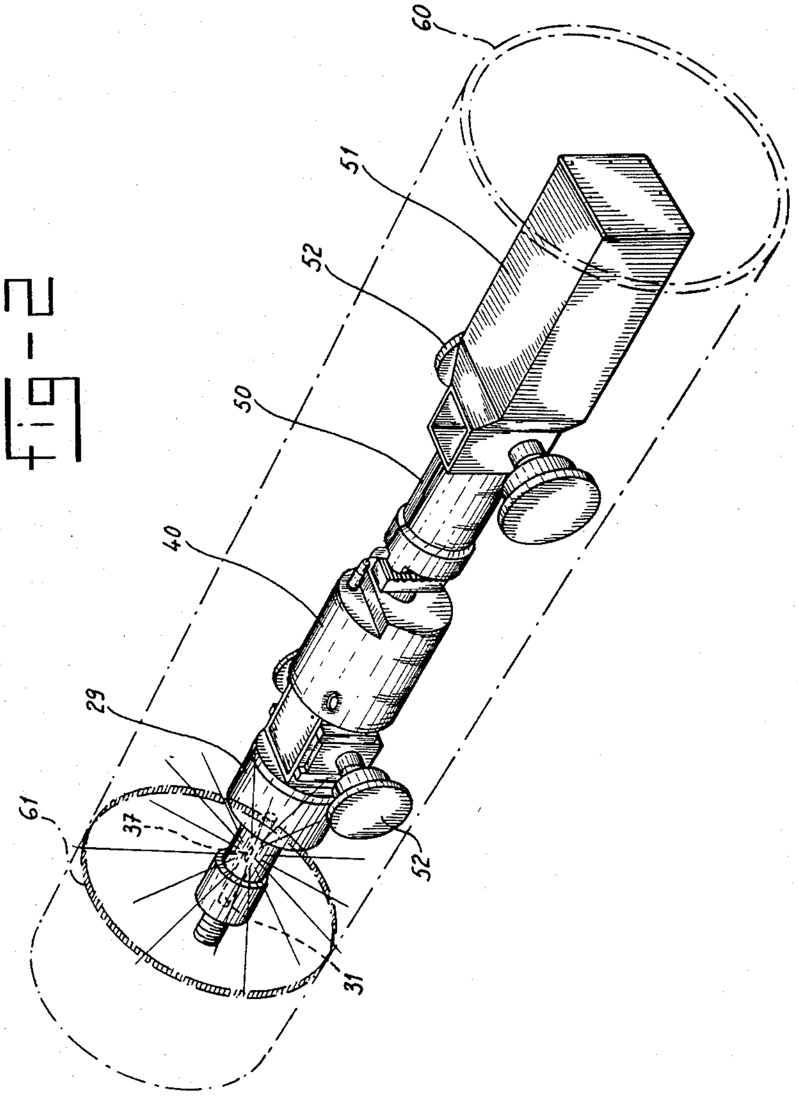
FIG. 2 shows a schematic drawing of the carriage in a pipeline being assembled into an entity with the projector of FIG. 1 and the electronic control unit.

The carriage schematically indicated in FIG. 2 as an example is destined for the movement of the gamma projector according to FIG. 1 in a pipe-line 60, in which the welded joint 61 has to be examined. The radio-active source 37, the bar shaped source holder 31, the container 29 and the micro-pneumatic device 40 are indicated like in FIG. 1. A driving motor 50 is coupled to the container and drives the wheels 52. The electronic control unit 51 controls the motor 50 and the micro-pneumatic device 40.

The operation of the carriage and the action of the gamma projector can be remotely controlled by means of gamma radiation from another separate radio-active source having relatively low activity. A counting system is applied in the electronic control unit 51 to process the radiation pulses for the said control. The program of the cycles is predetermined such that the carriage is brought to a standstill opposite the welded joint 61 to be examined through means of a gamma control unit fitted on the outside of the pipe-line and provided with said other radio-active source. Said gamma control unit each time is positioned on a fixed distance with respect to each joint to be examined. Subsequently the radio-active source 37 in the gamma projector is brought to the exposure position and the exposure of the film fitted around the weld in the pipe-line is started. After the exposure time is ended, the radio-active source is moved back to the safe rest position in the protective housing 29 and the carriage is driven to the next welded joint under control of the gamma control unit fitted on the outside of the pipe-line. The said pulses emitted by the radio-active source in the gamma control unit have a duration of about one second, and the interval between succeeding pulses also amounts to about one second.

Said carriage is controlled in an unequivocal positive manner in the following way:

one radiation pulse for moving forwards;
one radiation pulse for stopping;
two radiation pulses for driving backwards;
four radiation pulses for (radiation) exposure.

The electronic unit 51 in the movable projector unit does not accept any other number of pulses from the gamma control unit, and in case such another number of pulses occurs, the system is reset to the neutral position. By this is it prevented that the carriage operates in an uncontrollable manner. Said four pulses for the exposure instruction do make the carriage and the projector insensitive to parasitic or other back ground radiation resulting from radiologic activities.

The major advantage of the projector unit according to the invention is that a far better fail-safe method is obtained, that there is no requirement for larger power supplies, and that a simple gas cartridge (high pressure) suffices, whereby through miniaturization this system can be used in pipe-lines of smaller cross-section.

I claim:

1. A movable projector device for inspecting by gamma rays a weld in a pipe-line and the like, comprising:

a motor driven carriage, a gamma radiation projector mounted on said carriage and including a radiation source holder and a radiation source, said projector being provided with a protective housing having an axially extending channel therein for the movement of said radiation source holder, a micro-pneumatic device coupled to said radiation source holder protective housing so as to form an integrated unit therewith, said micro-pneumatic device including a gas supply tank containing highly pressurized gas, a piston-cylinder device, the cylinder of said piston-cylinder device extending through an axial inlet bush tube in said gas supply tank and the piston rod of said piston-cylinder device being connected to said radiation source holder, said highly pressurized gas being supplied to the cylinder of said piston-cylinder to extend said piston rod and thereby move said radiation source holder into said exposure position, said gas being exhausted on the return stroke of said piston rod, thereby performing a self-cleaning action in said piston-cylinder device, and a remotely controllable electronic unit including means for receiving and processing control commands, and adapted to control selectively said carriage motor and to control selectively said micro-pneumatic device in response to said control commands, said control commands comprising pulse signals of different numbers corresponding to respective forward, stop and reverse drive commands and for radiation exposure.

2. The movable projector device according to claim 1, and further comprising a second radiation source having relatively low activity which generates said control commands in the form of pulsed gamma radiation.

3. The movable projector device according to claim 1, in which the micro-pneumatic device includes an adjusting block for adjusting the stroke length of the piston rod, and therewith the stroke length of the source holder to the exposure position, in a range between 10 mm and 75 mm.

4. The movable projector device according to claim 1, wherein said gas supply tank includes a reducing valve which can be adjusted in a range from 17 to 1.5 Bar.

5. The movable projector device according to claim 1, wherein said protective housing, at the side of the exposure position, comprises an outlet piece having an axial channel portion for guiding said radiation source holder.

6. The movable projector device according to claim 5, wherein said outlet piece comprises a material scarcely influencing the gamma radiation, such that with a panorama exposure a radiographic image of the pipe weld is produced on a röntgen film.

7. The movable projector device according to claim 5, wherein said outlet piece comprises a shielding material having a window therein of a material scarcely influencing the gamma radiation, such that with a directional exposure via said window a radiographic image of the weld is produced on a röntgen film.

* * * * *